US010506489B2

(12) United States Patent
Vrzic

(10) Patent No.: US 10,506,489 B2
(45) Date of Patent: Dec. 10, 2019

(54) SYSTEM AND METHODS FOR NETWORK SLICE RESELECTION

(71) Applicant: Sophie Vrzic, Kanata (CA)

(72) Inventor: Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/233,285

(22) Filed: Aug. 10, 2016

(65) Prior Publication Data

US 2017/0086118 A1 Mar. 23, 2017

Related U.S. Application Data

(60) Provisional application No. 62/220,731, filed on Sep. 18, 2015.

(51) Int. Cl.
*H04W 36/26* (2009.01)
*H04W 36/22* (2009.01)
*H04W 36/14* (2009.01)

(52) U.S. Cl.
CPC ............ *H04W 36/26* (2013.01); *H04W 36/14* (2013.01); *H04W 36/22* (2013.01)

(58) Field of Classification Search
CPC ...... H04W 36/26; H04W 36/14; H04W 36/22
See application file for complete search history.

(56) References Cited

U.S. PATENT DOCUMENTS

2009/0113018 A1* 4/2009 Thomson ................ H04W 8/12 709/208
2011/0022676 A1 1/2011 Thomson et al.
2013/0336210 A1* 12/2013 Connor ................. H04W 4/003 370/328
2014/0086177 A1* 3/2014 Adjakple .............. H04W 12/08 370/329
2014/0112236 A1* 4/2014 Jung ................. H04W 36/0007 370/312
2014/0269295 A1* 9/2014 Anumala ................ H04L 41/08 370/235
2015/0295761 A1* 10/2015 Wang .................. H04L 41/0806 709/222
2016/0057681 A1 2/2016 Wang et al.
(Continued)

FOREIGN PATENT DOCUMENTS

CN 101843127 A 9/2010
CN 103650437 A 3/2014
(Continued)

OTHER PUBLICATIONS

Rachid El Hattachi/Javan Erfanian (Editors), and 5G Initiative Team, NGMN 5G White Paper, Feb. 17, 2015, NGMN Alliance V1.0.*

(Continued)

*Primary Examiner* — Shailendra Kumar

(57) ABSTRACT

There is provided method for managing network resources by switching the slice used to support a user equipment (UE), in a process referred to as slice handover or slice switching. There are several reasons why a slice handover may be implemented, include movement of the UE and network load balancing. Further the UE can be switched to a new slice operated by the same service provider (intra-operator handover) or a different service provider (inter-operator handover).

23 Claims, 10 Drawing Sheets

NS Request 130
OSS/BSS 125 G-CSM SSF 187 188
MBB Slice 120 181 186 191 176 CMM CSM IM-SM FM
100
MTC Slice 115 180 185 190 175 CMM CSM IM-SM FM
Global Functions 110 182 160 165 170 G-CMM LM DA CF
105 NFVI
135 NFV-MANO 140 Orchestrator IM (Broker, Negotiator) 194 SDT 197 SDP 196 TE 195
145 VNFM(s)
150 VIM(s) 193 SDN-C

(56) References Cited

U.S. PATENT DOCUMENTS

2017/0079059 A1* 3/2017 Li ........................ H04W 16/02
2017/0332359 A1* 11/2017 Tsai .................... H04W 72/042
2017/0374614 A1* 12/2017 Lemieux ............ H04L 65/1016

FOREIGN PATENT DOCUMENTS

| | | | |
|---|---|---|---|
| EP | 2986050 | A1 | 2/2016 |
| WO | 2009058561 | A1 | 5/2009 |
| WO | 2014176777 | A1 | 11/2014 |
| WO | 2017171598 | A1 | 10/2017 |

OTHER PUBLICATIONS

3rd Generation Partnership Project;Technical Specification Group Services and System Aspects; Feasibility Study on New Services and Markets Technology Enablers; Stage 1 (Release 14), Aug. 2015, 3GPP TR 22.891 V0.2.0 (Aug. 2015).*

Kddi et al., Solution: Support of Switching of Network Slice; SA WG2 Meeting #S2-114 S2-161413; pp. 1-3, Sep. 15, 2016.

LG Electronic Inc.; Solution on Network Slice Instance Reselection; SA WG2 Meeting #116BIS S2-165256; 02, pp. 2-9, Sep. 2, 2016.

International Search Report dated Nov. 21, 2016 for corresponding International Application No. PCT/CN2016/099229 filed Sep. 18, 2016.

Xu, Chen et al., Advances on Software-defined Wireless Networking; Journal of Chongqing University of Posts and Telecommunications (Natural Science Edition); No. 4, vol. 27, Aug. 31, 2015. (Abstract only).

Hu, Xun et al., A Joint Utility Optimization Based Virtual AP and Network Slice Selection Scheme for SDWNs; Communications and Networking in China (ChinaCom), 10th International Conference, Aug. 17, 2015.

English translation of CN103650437.

European Telecommunications Standards Institute, “LTE; General Packet Radio Service (GPRS) enhancements for Evolved Universal Terrestrial Radio Access Network (E-UTRAN) access”, (3GPP TS 23.401 version 12.8.0 Release 12), Apr. 1, 2015.

Mobile Competence Centre. “3rd Generation Partnershop Project; Technical Specification Group Services and System Aspects; Study on Architecture for Next Generation System”, (3GPP TR 23.799 version 0.7.0 Release 14) Aug. 5, 2016.

LG Electronics Inc., “Solution on Network Slice Instance Reselection”, SA WG2 Meeting #116BIS, Aug. 23, 2016.

LG Electronics Inc., “Solution on Network Slice Instance Reselection”, Sep. 3, 2016.

3GPP TS 23.501 V15.0.0 (Dec. 2017), Technical Specification, 3rd Generation Partnership Project; Technical Specification Group Services and System Aspects; System Architecture for the 5G System; Stage 2 (Release 15), Dec. 2017.

* cited by examiner

SYSTEM AND METHODS FOR NETWORK SLICE RESELECTION

CROSS-REFERENCE TO RELATED APPLICATIONS

This application claims the benefit of priority to U.S. Patent Application Ser. No. 62/220,731, entitled "SYSTEM AND METHODS FOR NETWORK SLICE HANDOVER" filed Sep. 18, 2015, which is hereby incorporated by reference in its entirety.

FIELD OF THE INVENTION

The present invention pertains to the field of communications networks, and in particular to systems which implement network slicing.

BACKGROUND

Communication networks enabled by technologies such as Network Function Virtualization and Software Defined Networking, may be flexibly organized so as to serve various customer demands. In building advanced networks, such as those to support future developments in wireless networks (including next generation, or so-called Fifth Generation (5G) wireless networks), network slicing provides the ability to create isolated virtual networks over which different traffic flows can travel isolated from each other. However, managing variable and competing demands on a potentially large network scale is a complex proposition requiring an effective architecture and management thereof.

Network operators serve different sets of demand for different types of UEs using different services. As the number of supported services increases, the differences in the traffic profiles associated with the different services is likely to become more stark. To support a plurality of different services each of the services associated with different types of UEs, the network will need to support the transmission and mobility profiles of all the devices. Typically this has meant that the network is designed with the assumption that each UE has to be assigned sufficient resources to accommodate the most extreme transmission and mobility profiles. As the number of devices and services increase, this may pose a large burden on the network operator and may result in heavily over-provisioned networks When a user equipment (UE) associated with an existing slice, moves to another location, there is no guarantee that the UE can attach to the existing slice in the new location. Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and methods for network slice reselection/handover. In accordance with embodiments of the present invention, there is provided a method for managing network resources by switching the slice used to support a user equipment (UE), in a process referred to as slice handover or slice reselection. There can be several triggers for a slice handover/reselection including: movement of the UE, changes to the mobility requirements of the UE, a slice management event, and in some embodiments network load balancing. A slice management event includes the instantiation of a slice, the termination of a slice or the modification of the capacity a slice. Further the UE can be switched to a new slice operated by the same service provider (intra-operator handover) or a different service provider (inter-operator handover).

In accordance with an aspect of the present invention, there is provided a method for network slice reselection. Such a method includes receiving, over a network interface, an indication that a slice reselection triggering event associated with a mobile device attached to a first slice has occurred. Such a method can further include selecting a second slice as a target slice, and initiating a migration of the mobile device to the selected target slice. In some embodiments the first slice and the second slice are operated by the same service provider. In some embodiments the first slice and the second slice are operated by different service providers. In some embodiments the received indication that a slice reselection triggering event has occurred is indicative of a change in the service requirements of the mobile device. In some embodiments the the received indication is indicative of the mobile device receiving a clearer signal from a second access point. In some embodiments the received indication is indicative of changes to the mobility requirements of the mobile device. In some embodiments the received indication is indicative of the occurrence of a slice management event. In some embodiments a slice management event is selected from the group consisting of: creating a new slice; terminating an existing slice; and modifying the capacity of an existing slice. In some embodiments initiating the migration of a mobile device to the target slice further includes initiating the migration of a group of mobile devices to the target slice. In some embodiments initiating a migration of the mobile device to the selected target slice includes sending messages to network components in order to migrate the mobile device to the target slice. In some embodiments the method is executed by a node implementing a network slice selection function and the first slice belongs to a first network. In such embodiments, responsive to slice selection function determining that the mobile device can be migrated to a second slice within the first network, selecting the second slice and transmitting an instruction towards the mobile device to instruct the mobile device to connect to the second slice. In some embodiments, the method can further include selecting a slice in a second network, and wherein initiating the migration further includes transmitting a request for admission of the mobile device to a slice towards a node in the second network. In some embodiments the received indication that a slice reselection triggering event has occurred is indicative of a change in the service requirements of the mobile device, and is further indicative of a movement of the mobile device to a service area associated with the second network. In some embodiments the slice reselection event occurs when differing capacities between network slices reaches a load-balancing threshold; in which case receiving a trigger for a slice reselection based on the occurrence of a slice reselection event includes receiving a trigger from a load monitoring function which measures the capacities loads of the slices.

Another aspect of the present invention slice selection function. Such a slice selection function includes a network interface for receiving indications of triggering events and for transmitting instructions, a processor and a non-transient memory for storing instructions. The instructions, when executed by the processor, cause the slice selection function to, upon receiving an indication that a slice reselection triggering event associated with a mobile device attached to a first slice has occurred, select a second slice as a target slice; and to initiate a migration of the mobile device to the selected target slice. In some embodiments a slice reselection triggering event occurs when there is a change in the service requirements of the mobile device. In some embodiments the service requirements of the mobile device changes in response to changes to the mobility requirements of the mobile device. In some embodiments the service requirements of the mobile device changes in response to the movement of the mobile device. In some embodiments the instructions which cause the slice selection function to initiate a migration of the mobile device to the selected target slice includes instructions which cause the slice selection function to send messages to network components in order to migrate the mobile device to the target slice. In some embodiments the slice reselection triggering event includes a slice management event selected from the group consisting of: creating a new slice, terminating an existing slice, or modifying the capacity of an existing slice.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
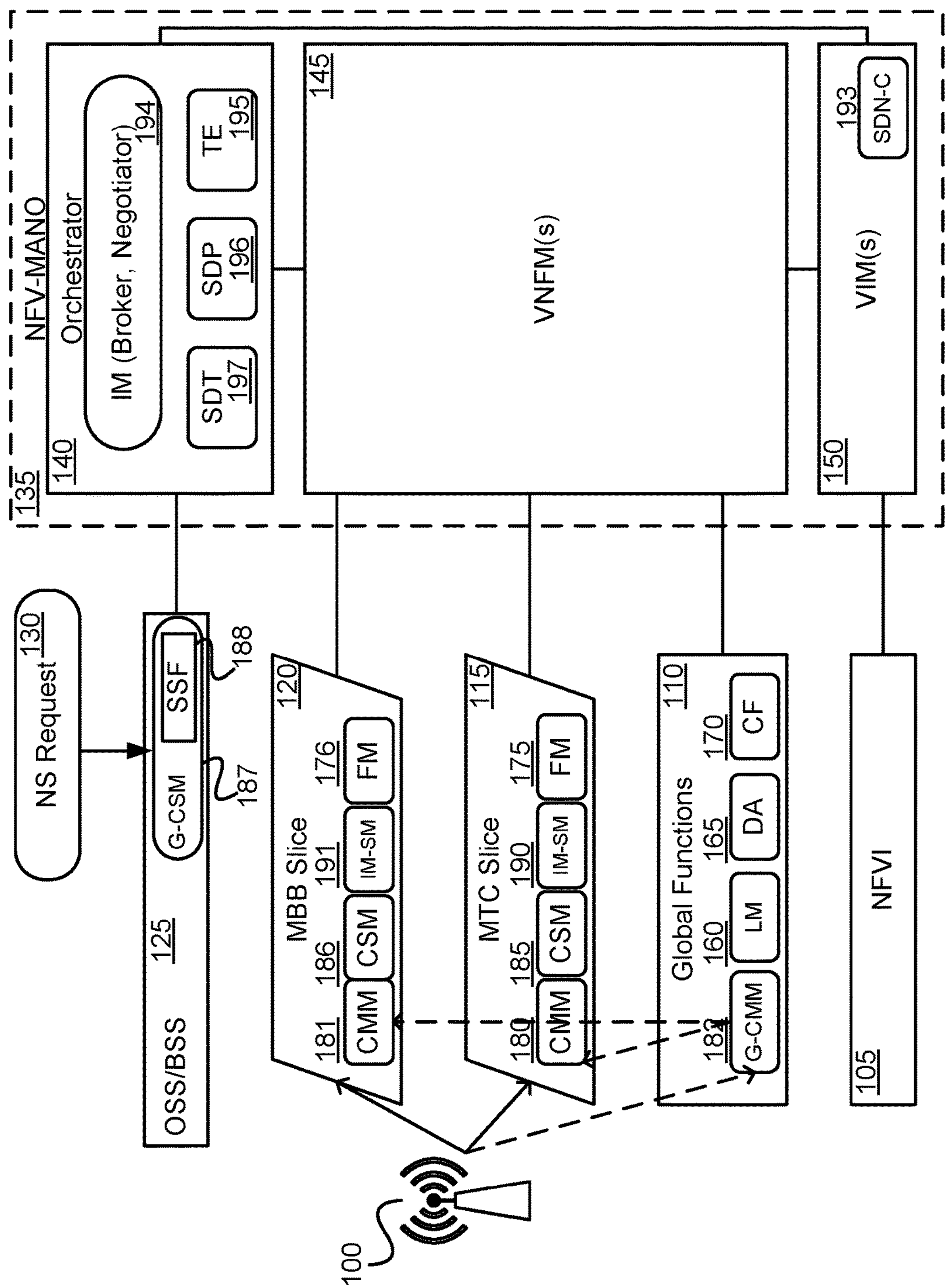
FIG. 1 illustrates an overview of the communication network architecture in accordance with embodiments of the present invention.

As used herein, a "network" or "communication network" may serve various devices including but not necessarily limited to wireless devices. Such a network may include a radio access portion and backhaul portion. The network may further comprise various virtualized components as will become readily apparent herein. A primary example of such a network is 5G network which is reconfigurable and capable of network slicing, as described below.

Network slicing is a network management technique in which both compute and connectivity resources in a communications network are divided to create a set of isolated virtual networks. When combined with other techniques such as Network Function Virtualization (NFV), Virtual Network Functions (VNFs) can be instantiated upon generic computing resources to provide specific network functions. This allows different slices of the compute and connectivity resources to be put together into a set of network slices, each of which is isolated from the other slices. The connectivity between these computing resources can be allocated so that traffic associated with each network operator is isolated from another. Isolation of the resource usage and traffic within a slice allows for different services to be isolated on different slices. Through the use of NFV, the capability and location of the network functions can be adjusted to suit the specific needs of each operator within their allocated slice. A first network slice may be configured to suit the needs of a Machine Type Communication (MTC) service that generates large number of short transmissions, where MTC devices do not need ultra-reliable connections because reliability can be designed at the application layer. This network slice would differ in its configuration and resource demands from a network slice that is designed to serve the needs of User Equipment connecting for the purposes of an enhanced-Mobile-Broadband (eMBB) connection. By providing different slices for different services, an operator can ensure that the specific needs of a service are met without requiring the overprovisioning of resources to each connection that would be required if a single slice was used for all services. It will be understood that the slices created to serve the needs of different services may be built upon the resources allocated to the network operator within a slice that isolate the network operator from other network operators on a set of resources associated with a service provider. It is anticipated that network slicing techniques, as well as Network Function Virtualization techniques will be employed in future generations of mobile networks, including so-called fifth generation (5G) communications networks that are used to provide network services to mobile devices such as UEs.

In some embodiments a method for managing network resources includes receiving a trigger indicating a service to a user equipment (UE) should switch from a first network slice to another network slice.

As noted above, a carrier typically operates a network as a collection of computing and connectivity resources. To ensure that services with dramatically different network usage profiles are accommodated without massively overprovisioning the networks, the underlying network resources can be used as a base upon which network slices are instantiated. Each network slice can operate as a virtualized private network dedicated to a service or a type of traffic. Traffic can be contained within the slice so that there is a degree of traffic isolation between two slices. The parameters of each slice can be matched to a service, so that, for example, a slice used for machine-type communication (MTC) devices that is used for reporting usage and status information from a set of connected utility meters will be differently selected than the parameters of a slice that is used for mobile broadband (MBB) communications. In the above example, an MTC slice may be designed to support a large number of connected devices that each transmit small delay-insensitive messages, while the MBB slice may be designed for a smaller number of connected devices, but provisioned to provide each of the devices with higher data rate and low latency connections. Through the use of Network Function Virtualization (NFV) computing resources can be used to create a configurable set of network functions within a slice, where needed. This can provide the slice a logical topology specific to its needs. A network slice (as defined in 3GPP TR 22.891 entitled "Study on New Services and Markets Technology Enablers" not yet released) is a collection of logical network functions that supports the communication service requirements of a particular network service. One use of network slicing is in the core network. Through the use of network slicing, different core networks can be run on the same or overlapping physical set of network and computing resources. Network slicing can also be used to create independent virtual networks dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In a conventional mobile network, a UE is associated with a Mobility Management Entity (MME) during the attach process. The MME associated with the mobile device is selected from a pool of MMES by a selection function in a network infrastructure component such as the eNodeB. In contrast with a single network that must be designed to meet the needs of each wireless device, network slicing allows the instantiation of a plurality network slices on the physical network resources. Each of the slices can be created so that it has characteristics tailored to the particular requirements of a single network service. The use of network slices allows for the isolation of different types of traffic, which each may have different packet processing requirements and QoS requirements. Network slicing may correspond to the allocation of pooled resources to offer different services to different customers or groups of customers. Accordingly, different services can be supported by different customized virtual networks, where the different customized virtual networks are substantially separate from one another from the customer's point of view. The pooled resources may be commercial hardware components that are configured to provide different functionality through the use of function virtualization, such as NFV. By virtualizing the functions needed at the locations that they are required, when they are required, the slice can be provided the network functions to handle the designated traffic and processing requirements.

The Network Function Virtualization (NFV) framework can be used to define a plurality of virtual network functions (VNFs), each of which can correspond to a function enabling operation of a communication network. For example a VNF can provide the functions of a router, switch, gateway, firewall, load balancer, server and the like. As opposed to conventional deployments in which dedicated physical nodes are deployed to carry out specified functions, a virtual function can be instantiated on demand using available computing and connectivity resources. As demand for the function increases, the resources allocated to the function can be increased. If demand for the function ceases, the function can be terminated. As such, VNFs may be instantiated on an as-needed basis using available resources. NFV and virtual network functions architecture is described in ETSI GS NFV 001 entitled "Network Function Virtualization (NFV); Use Cases", October 2013 and ETSI GS NFV 002 entitled "Network Function Virtualization (NFV); Architectural Framework", October 2013, for example.

To provide context to aid in the understanding of network slicing, and the concept of a network slice, it is helpful to understand that in heterogeneous networks in addition to a plurality of different types of nodes covering different locations, different infrastructure providers may own different parts of what is considered as an access network (or even parts of a core network). For example an M2M virtual network operator (VNO) (which may also be referred to as an M2M SP) or another virtual service provider may utilize the network resources of a service provider (SP), such as a Telecommunications Service Provider (TCSP). As such, the TCSP will create a virtual network (VN) having virtual nodes and virtual links between the nodes. The M2M SP will be able to control these virtual network (VN) resources in order to provide service to the VNO's customers. However, the VN (both nodes and links) need to be mapped to physical infrastructure. The VN may only use a subset of the physical nodes, and each physical node that the VN uses may not be fully used by that VN. It should also be understood that the M2M SP may make use of more than one TCSP, allowing it to create a network formed from a plurality of slices across different networks, effectively having a network slice that utilizes resources of a plurality of TCSPs. If certain bandwidth requirements are set for each logical link, then percentages of physical links are allocated to create the virtual link. This may also include aggregating links to create a logical link of greater capacity than a single physical link. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that the size and nature of different network slices can vary with time as new resources come online or as existing resources are re-allocated. The M2M SP is typically unaware of changes in the underlying physical infrastructure.

According to embodiments of the present invention, the communication network architecture can be based on a Network Function Virtualization (NFV) framework. The NFV Management and Orchestration (MANO) entity is used to instantiate the necessary network functional components in order to suitably provide the service indentified by a Network Service (NS) request. The instantiation of a network service request is described by a Virtual Network Function Forwarding Graph (VNFFG) which defines the set of network functions that are required to provide the requested service. The VNFFG contains a Network Forwarding Path (NFP) that defines a sequence of actions that are to be performed, for example by a collection of VNFs, to provide the requested service.

FIG. 1 illustrates an overview of a communication network architecture in accordance with embodiments of the present invention. The NFV-MANO entity 135 includes an Orchestrator function 140, a Virtual Network Function Manager (VNFM) function 145 and a Virtual Infrastructure Manager (VIM) function 150. According to embodiments, the functionality of the Orchestrator function 140, VNFM function 145 and VIM function 150 can be as defined in ETSI GS NFV 001 and ETSI GS NFV 002, for example.

According to embodiments, the VIM function 150 is configured to manage the Network Function Virtual Infrastructure (NFVI) 105 which can include physical infrastructure, virtual resources and software resources in a NFV based network. For example physical infrastructure can include servers, storage devices and the like and virtual resources can include virtual machines. According to embodiments, there can be a plurality of VIM functions instantiated within a particular NFV architecture, wherein each VIM function is responsible for the management of its respective NFVI.

According to embodiments, the VNFM function 145 can be configured to manage the Virtual Network Functions (VNF) and can manage the lifecycle of the VNFs. For example the VNFM function 145 can create, maintain and terminate VNF instances, which can be installed on virtual machines that are created and managed by the VIM function 150. The VNFM function 145 can also be configured to provide fault, configuration, accounting, performance and security management (FCAPs) of the VNFs. In addition, the VNFM function 145 can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

According to embodiments the Orchestrator function 140 can be configured to coordinate, authorize, release and engage the NFVI resources by interaction with the VIM function 150. The Orchestrator function 140 further is configured to create end to end service between different VNFs by interaction with the VNFM function 145.

With further reference to FIG. 1, a plurality of network slices and a Global Control Plane 110 used for network slice management in accordance with embodiments of the present invention is illustrated. The Global Control Plane 110 controls functions across multiple and potentially all the network slices. The Global Control Plane 110 may be regarded as a separate network slice in some embodiments. The illustrated network slices include a Mobile Broadband (MBB) network slice 120 and a Machine Type Communication (MTC) network slice 115. It should be appreciated that other types of network slices may be used, for example a slice can be created for each virtual network. Furthermore a plurality of slices can be established for each type.

In various embodiments, both the Global Control Plane functions and each network slice specific control plane functions may be instantiated at an arbitrary location in the network by the NFV-MANO entity in order to provide connection management across a plurality or all of the network slices. The location of these functions may depend on performance factors such as delay requirements of different network services being provided.

The functions configured within the Global Control Plane 110 can include the Global Connection and Mobility Management (G-CMM) function 182, Infrastructure Management (IM) function which can contain a manager function and a negotiator function for obtaining computing, storage and network resources for core network functions. In some embodiments the IM function contains a Spectrum Manager (IM-SM) function which is configured to manage spectrum resources. The Global Control Plane 110 can also include a Load Monitor (LM) Function 160, Data Analytics (DA) function 165 and Cache and Forwarding (CF) function 170. When implemented, a Data Analytics (DA) function 165 can be assigned responsibility for collecting statistics and data across multiple and potentially all network slices. These statistics and data collected can be used by the LM 160 in order to manage, evaluate operation conditions and the like or a combination thereof, for each of the network slices. The Cache and Forward (CF) function 170 is responsible for management of the cached content across multiple and potentially all network slices. It should be appreciated the functionality of the DA and LM can be combined in some embodiments, or located elsewhere in the network.

In more detail, the G-CMM function 182 is responsible for maintaining a list of the instantiated network slices and the parameters associated with each network slice (e.g. Operator ID, service type, etc.). The G-CMM function 182 is further responsible for maintaining a pool of Connection and Mobility Management (CMM) functions, wherein each CMM function is instantiated as a local or network slice specific function. The G-CMM function 182 is further responsible for initial association to a network slice. As will be discussed in more detail below, the G-CMM function 182 can also be utilized when a slice reselection occurs, in which a mobile device, or a group of mobile devices, is migrated from one slice to another. A slice reselection is also known as a slice handover (HO).

In embodiments, the network architecture further includes a Global Customer Service Management (G-CSM) function 187 which is configured to receive the Network Service (NS) Requests 130 and act upon same through communication with the Orchestrator function 140 of the NFV-MANO entity 135. For example, a Network Service Request may be indicative of one or more User Equipment requesting connection to the communication network. The G-CSM function 187 is responsible for maintaining a pool of Customer Service Management (CSM) functions, wherein each CSM function is instantiated as a local or network slice specific function. The G-CSM function 187 is further responsible for keeping track of charging, for example billing, across multiple or potentially all network slices. The G-CSM function 187 can be configured to monitor network slices and provide feedback to the Orchestrator function 140 about the performance of a network slice. In some embodiments the G-CSM 187 includes a Slice Selection Function SSF 188. The SSF 188 can receive input from the DA 165 and/or the LM 160 or alternatively in some embodiments can include these functions. The G-CSM 187 can thereby enabling optional fine tuning of the network and computing resources for a particular slice, as managed by the VNFM function 145 and the VIM function 150. The fine tuning can provide for the substantial optimization of the operation of the respective network slices in terms of, for example, computing resource usage. As will be discussed in more detail below, the SSF 188 can also be utilized when a slice reselection occurs, for example for load balancing. It some embodiments the SSF 188 may instead form part of another function, for example the G-CMM function 182, or be instantiated as a separate network function.

According to embodiments, the G-CSM function 187 can be functionally integrated within the Operational Support System/Business Support System (OSS-BSS) 125. The OSS can include functions that support back-office activities which aid in operating a communication network, as well as provisioning and maintaining customer services and the like. The BSS can include functions that support customer-facing activities, for example billing order management, customer relationship management, call centre automation and the like. In this embodiment, the G-CSM function 187 can communicate with the Orchestrator function 140 using the Os-Ma-nfvo interface, which provides communication between the OSS/BSS 125 and the Orchestrator function 140.

According to some embodiments, the G-CSM function 187 can be instantiated within the network but external to the OSS/BSS 125. In this configuration, another interface, which may not be defined with the NFV framework, is configured in order to provide communication between the G-CSM function 187 and the Orchestrator function 140.

With further reference to FIG. 1, the various network slices, for example the MBB slice 120 and MTC slice 115, may each include their own network slice specific Connection and Mobility Management (CMM) function 181, 180 and Customer Service Management (CSM) function 186, 185. The network slice specific CMM functions 181, 180 are referred to and controlled by the G-CMM function 182 operating within the Global Control Plane 110. Each network slice further includes a Flow Management (FM) function 176, 175 which can be configured to tune the performance of the network slice by dynamically analyzing, predicting and regulating behaviour of data transmitted over that network slice. In addition, each of the network slices further includes an Authentication and Authorization (AA) function, which may provide authorization of access of a UE to use of the communication resources of the particular network slice.

In some embodiments, each network slice further includes a network slice specific Infrastructure Management function containing a Spectrum Negotiator function (IM-SN) 191, 190. In some embodiments, the IM-SN function is not contained within the network slice but instead may reside within the Cloud Radio Access Network (C-RAN) functions or a global function.

Although only a single Access Point (AP) 100 is shown for clarity, it will be readily understood that multiple Access Nodes are supported. In some embodiments, a plurality of access nodes supporting different radio access technologies is also supported. In embodiments, an AP throughout the various figures may correspond to one or more access nodes, including base stations such as Node B, evolved Node B, a combination of a Remote Radio Unit (RRU) operatively coupled to one or more Baseband Unit (BBU).

Figure 2:
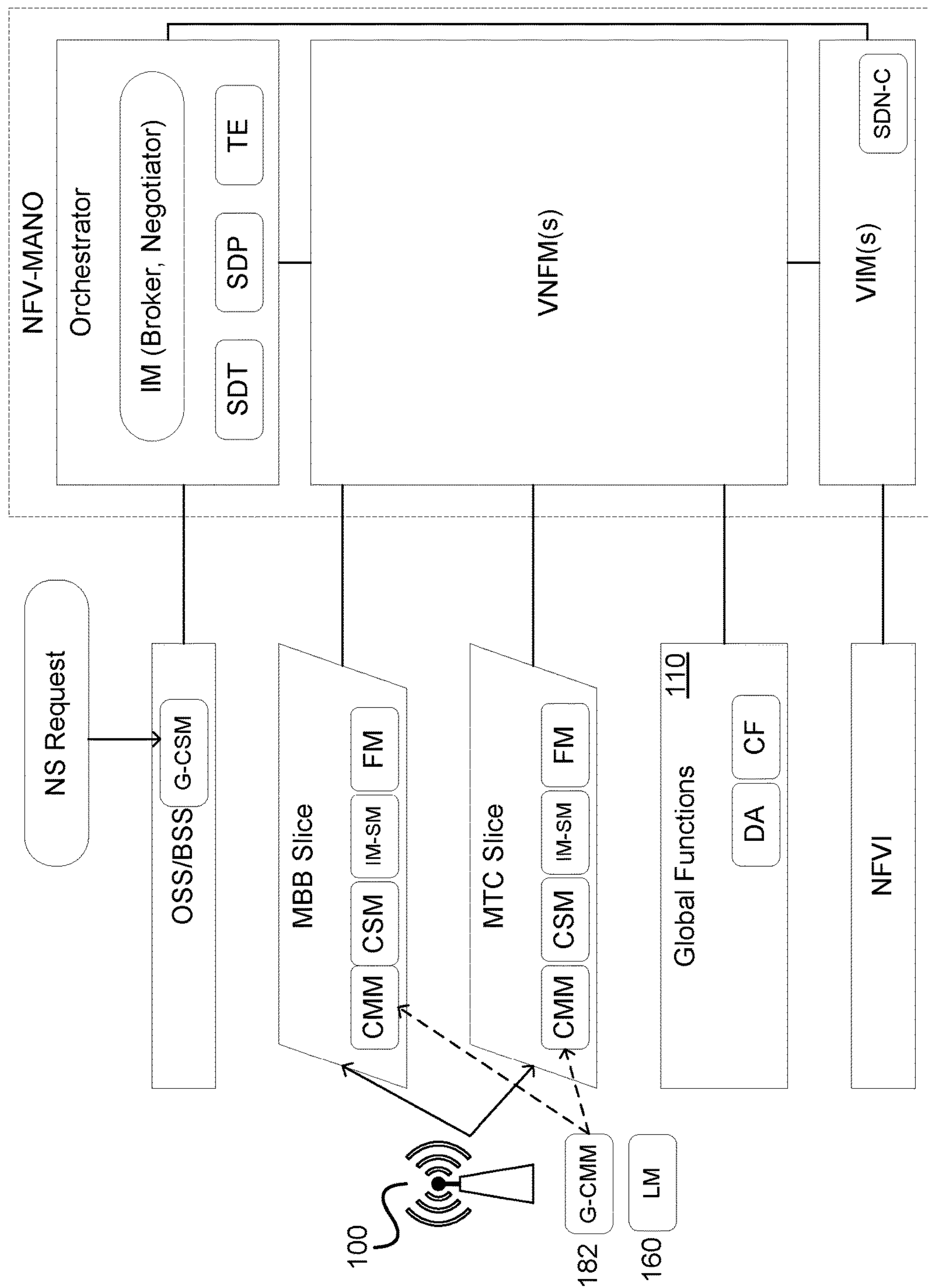
FIG. 2 illustrates an overview of another communication network architecture in accordance with embodiments of the present invention.

With reference to FIG. 2, the G-CMM function 182 which can control or interact with the CMM functions in a plurality network slices can be instantiated close to the AP 100. In this embodiment, the LM function 160 can also be instantiated close to the AP 100 along with the G-CMM function 182. In some embodiments, the processing functions of an AP may be physically separated from the radio head, and instantiated within a data center. In such embodiments, it is possible that a single G-CMM function 182 can be instantiated within a data center that also provides the processing functions for a plurality of APs.

Figure 3:
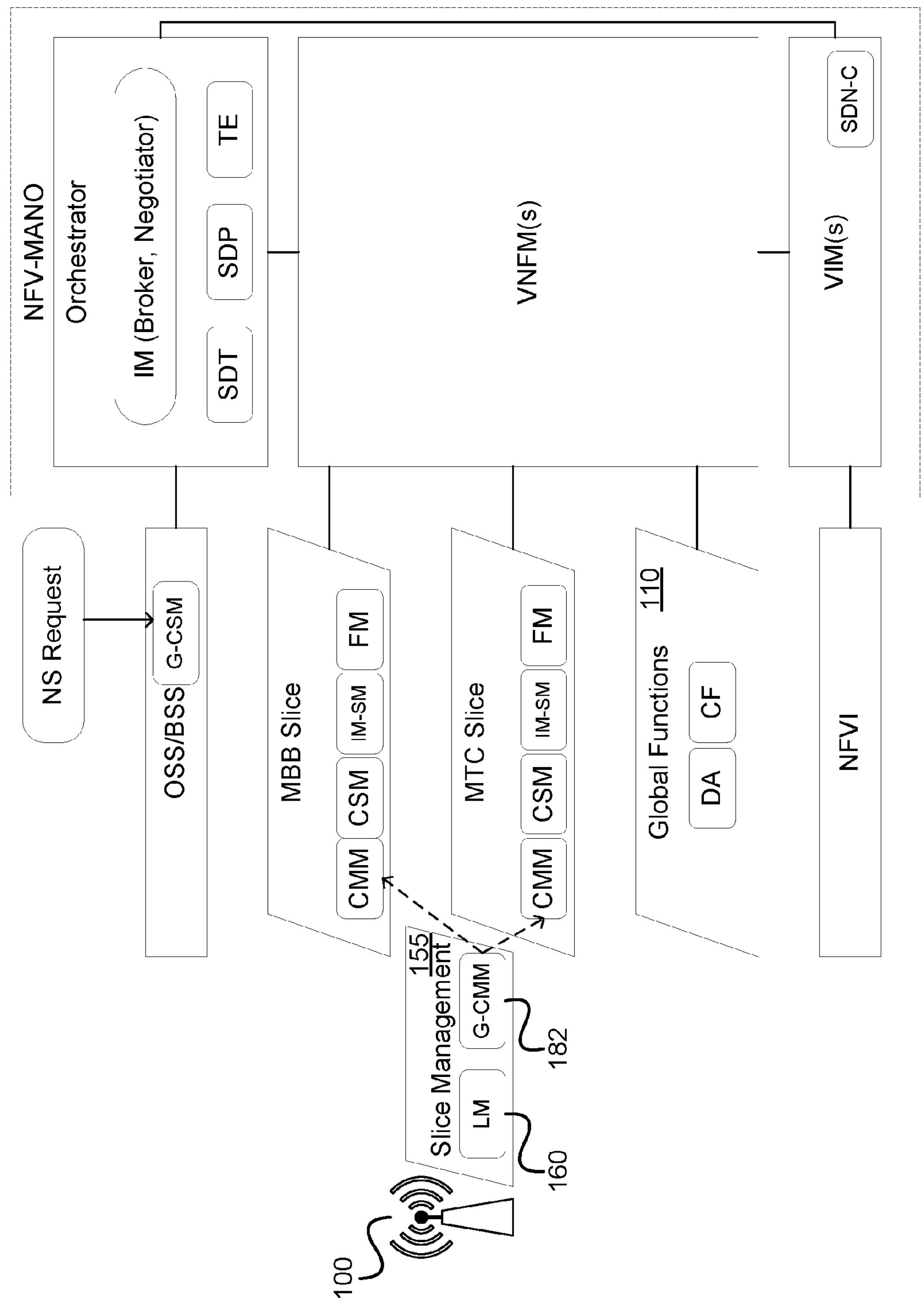
FIG. 3 illustrates an overview of another communication network architecture in accordance with embodiments of the present invention.

With reference to FIG. 3, a Slice Management control plane function 155 which includes the G-CMM function 182 and the LM function 160, is instantiated within the network architecture. The Slice Management control plane function 155 can be located within the RAN or close to the Core network/RAN boundary. In some embodiments the Slice Management control plane function 155 can include other functions, such as the G-CSM function 187 and/or the DA function 165.

In accordance with embodiments of the present invention, the NFV-MANO entity 135 further instantiates NFV management plane functions that define the network topology for a Network Service (NS) request; determine the transport protocols to be used across links; and determine the underlying links between different network functions used by the network service. In some embodiments, these NFV management plane functions are integrated within the Orchestrator function 140 and include a Software Defined Topology (SDT) function 197, a Software Defined Protocol (SDP) function 196 and a Software Defined Resource Allocation (SDRA) function 192 and an Infrastructure Manager (IM) function 194.

Software Defined Networking (SDN) is a network management technique that allows a network management entity (e.g. an SDN Controller) to implement an architectural framework to create intelligent programmable networks, where the control planes and the data planes can be decoupled, network intelligence and state are logically centralized, and the underlying network infrastructure is abstracted from the application. In embodiments of the present invention, the Orchestrator function may instruct the instantiation of virtual network functions connected to form a network logical topology, for example as defined by the Software Defined Topology (SDT) function. The SDT function can be combined with the SDN and Software Defined Protocol (SDP) function to create a customized virtual network, wherein a virtual network is a collection of resources virtualized for a particular service.

According to embodiments, the SDT function 197 is instantiated as part of the Orchestrator function 140. The SDT function 197 is configured to determine the Point of Presence (PoP) for each VNF in the VNF Forwarding Graph (VNFFG) provided by the G-CSM function 187. The SDT function 197 is also configured to determine the logical links between the VNFs in the VNFFG.

According to embodiments, the SDRA function is configured to allocate the underlying link resources for each logical link defined in the VNFFG. The SDRA function may utilize other functional components, such as the SDN Controller (SDN-C) function 193 and the Traffic Engineering (TE) function 195. The SDN-C function 193 is instantiated within each VIM function 193 and is configured to provide the forwarding rules to the forwarding switches, for example routers and the like within the physical network architecture. The TE function 195 is instantiated within the Orchestrator function 140 and is configured to perform path computation between the source node and destination node while attempting to tune the path by dynamically analyzing, predicting and regulating behaviour of data transmission. According to embodiments, the SDP function 196 is instantiated as part of the Orchestrator function 140. The SDP function 196 is configured to determine the transport protocol stack for each of the logical links defined in the VNFFG.

Figure 4:
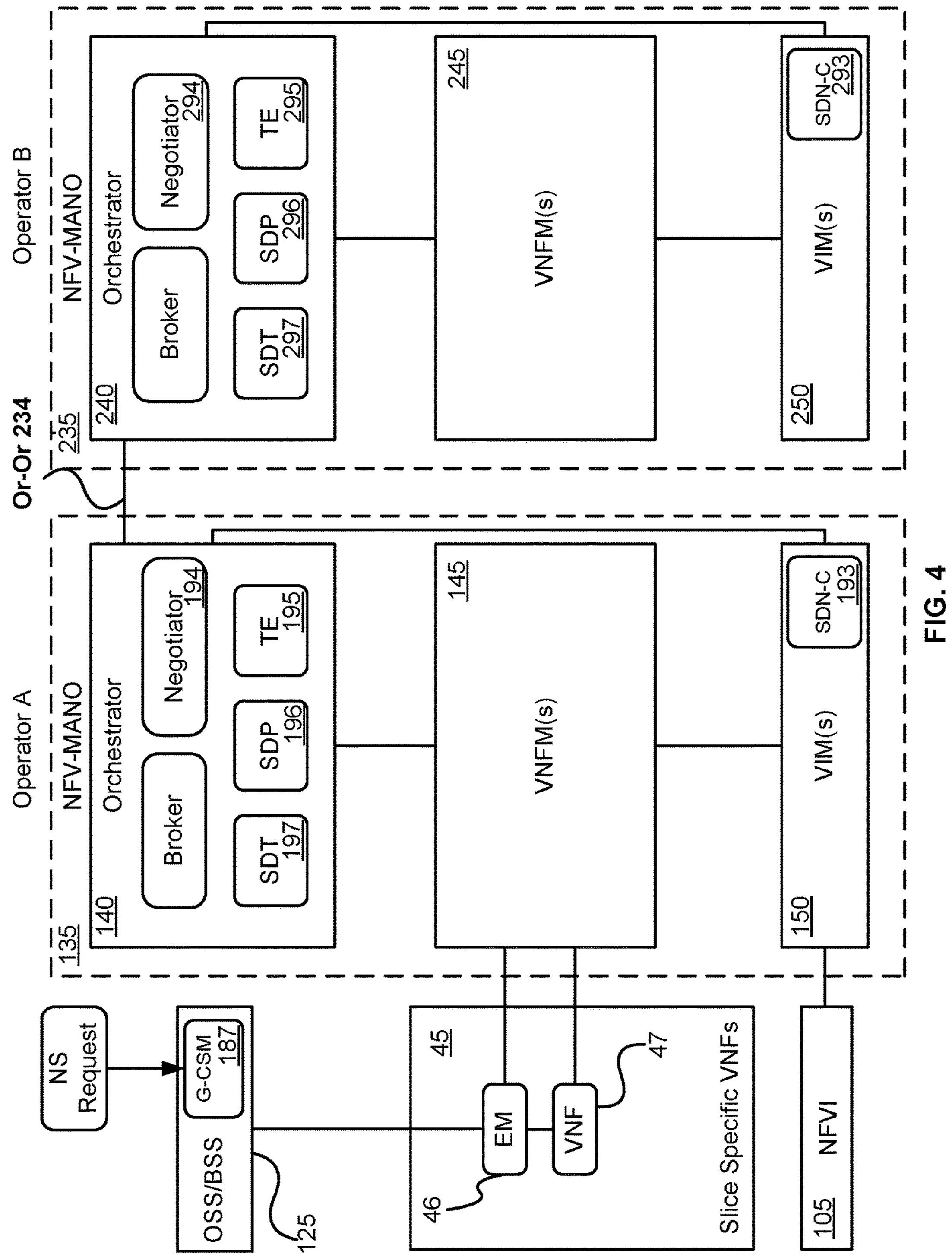
FIG. 4 illustrates a system for virtual infrastructure management including first and second Operators having internal Infrastructure Management functions in accordance with embodiments of the present invention.

FIG. 4 illustrates a system for virtual infrastructure management including first and second Operators having internal Infrastructure Management functions in accordance with embodiments of the present invention. The system comprises an Operational Support System/Business Support System (OSS/BSS) function 125, one or more Slice Specific Virtual Network Functions (SSVNFs) 45, Network Function Virtualization Infrastructure (NFVI) 105, a first NFV-MANO entity 135, and a second NFV-MANO entity 235.

As shown in FIG. 4, the first NFV-MANO entity corresponds to a first operator (Operator A) and comprises a first Orchestrator function 140, one or more Virtual Network Function Managers (VNFM(s)) 145, and one or more Virtual Infrastructure Managers (VIM(s)) 150. The Orchestrator function further comprises a Broker (e.g. Spectrum Broker), a Negotiator (e.g. Spectrum Negotiator) 194, a Software Defined Topology (SDT) function 197, a Software Defined Protocol (SDP) function 196, and a Traffic Engineering (TE) function 195. The VIMs further comprise a Software Defined Network Controller (SDN-C) function 193. The Orchestrator function is communicatively coupled to the G-CSM of the OSS/BSS, while the VNFM(s) are communicatively coupled to the Element Manager (EM) 46 and VNF 47 of the SSVNF(s) 45, while the VIM(s) are communicatively coupled to the NFVI 105. The functionality of the Orchestrator, VNFM, and VIM functions may be defined in ETSI GS NFV 001 and ETSI GS NFV 002, for example.

Still referring to FIG. 4, the second NFV-MANO entity 235 corresponds to a second operator (Operator B) and comprises the same set of functional elements as the first NFV-MANO entity 135. These functional elements in the second operator network include a Orchestrator function 240, one or more Virtual Network Function Managers (VNFM(s)) 245, and one or more Virtual Infrastructure Managers (VIM(s)) 250. The second Orchestrator function further comprises a Broker, a Negotiator 294, a Software Defined Topology (SDT) function 297, a Software Defined Protocol (SDP) function 296, and a Traffic Engineering (TE) function 295. The VIM(s) further comprise a Software Defined Network Controller (SDN-C) function 293. The first and second NFV-MANOs are communicatively intercoupled through their respective Orchestrators, via the Orchestrator-Orchestrator interface (Or-Or) 234.

The system of FIG. 4 may be used for managing network resources, for example, when the first NFV-MANO entity (Operator A) cannot satisfy a request for additional computing, storage, and network resources. For example, when a link is congested and no new paths can be configured to resolve the congestion, or if there are not enough resources for a network function to perform a scale-up or scale-out operation. Accordingly, the first NFV-MANO entity 135 may communicate with the second NFV-MANO entity 235 in order to obtain additional resources. Such a request is passed through the Or-Or interface 234.

In operation, the Global Customer Service Management (G-CSM) function 187 of the OSS/BSS receives a request, such as a Network Service Request (NS Request). The G-CSM then determines whether the NS Request can be accommodated on an existing network slice using the current (SSVNFs) with or without modification, or whether a new network slice is required. This determination is then sent to the first Orchestrator function, which proceeds to instantiate each necessary function for provision of the NS Request by creating a new network slice (i.e. instantiating a new set of SSVNFs) or adding any necessary functions to an existing network slice (SSVNF).

Each SSVNF 45 comprises an Element Manager (EM) 46 and a Virtual Network Function (VNF) 47, which functions to evaluate the services in the NS Request and determine whether there are sufficient resources to carry out the services. If there are insufficient resources, the SSVNF may send a trigger to the first NFV-MANO entity to request additional resources. In certain embodiments, the NFVI may also determine whether there are sufficient resources, and may also send a trigger to the first NFV-MANO entity if more resources are needed.

The first Orchestrator function of the first NFV-MANO entity can receive the trigger through a variety of possible routes including: i) from the VNF or EM of the SSVNF 45 via the OSS/BSS 125; ii) from the VNF47 of the SSVNF 45 via the VNFMs 145 of the first NFV-MANO entity; and iii) from the NFVI 105 via the VIMs 150 of the first NFV-MANO entity 135. Triggers initiated by the VNF of SSVNF may be based on performance metrics measure by the VNF. If the first Orchestrator function determines that there are insufficient resources to grant the request, it may send a request to the second Orchestrator function of the second NFV-MANO entity. The request may be sent from the Negotiator 194 of the first Orchestrator function 140, to the Broker of the second Orchestrator function 240 via the Or-Or interface 234.

While FIG. 4 depicts the first NFV-MANO entity corresponding to a first operator (Operator A), and the second NFV-MANO entity corresponding to a second operator (Operator B), in other embodiments, each NFV-MANO entity may correspond to the same operator. For example, the second NFV-MANO entity may be instantiated by Operator A in order to provide or manage spectrum resource requests.

Slice handover (HO), also referred to as slice switching or slice reselection, is now discussed. Slice handover/reselection refers to a process where a UE is served by a first slice, but due to mobility or other reasons, the UE is moved to another slice to receive network services. There are several reasons why moving a UE from a first slice to a second slice (a slice handover, or a slice reselection) may occur. One reason may be due to UE mobility. In this case, a user is attached to a first slice, and moves to a location that is not served by resources in the slice. To continue supporting the UE, the network can have the UE handed over to a second slice. In some cases, switching from one network slice to another may result in a change of performance (e.g. degraded performance). Another reason for a slice handover can be due to service requirement changes: For example, it may be desirable to switch from a network slice with high mobility support (e.g. when the UE is travelling at high speed on a highway) to low mobility support (e.g. when the UE moves into an urban area).

In addition to mobility related slice reselection, Slice reselection may also be triggered by a determination that the resources allocated to a network slice are overloaded. In this case, slice reselection can be used for load balancing by moving UE traffic from the overloaded slice to another slice. Such a slice reselection may be temporary, until a new slice is created or existing slices are reconfigured. Slice reselection may also be triggered by the completion of a slice management event. Slice management events include the addition (instantiation), deletion, and modification of a slice. Examples of these slice management events will now be provided. An NO may provide access to devices through MBB slice 120, and as MTC devices are added, they may be served through the MBB slice. When an MTC specific slice is created, a slice reselection procedure for the MTC devices may be undertaken to handover the devices to the new MTC slice in this example of a slice addition. If there is an MTC slice but there are an insufficient number of connected devices to justify the overhead associated with the slice, the slice can be deleted, but before this happens, the devices served by the soon-to-be deleted slice can undertake a slice reselection procedure so that they can be served by a different slice. If a slice is modified by adding to the allocated resources, the slice may be able to support more devices (and may also be able to support devices with heavier demands on the resources), and accordingly, devices in other slices may be selected to undertake a slice reselection process. If the slice modification includes decreasing the resources allocated to a slice, the mobile devices served by the slice, may undertake a slice reselection process to move some of the devices to other slices. It should be noted that there may be a process by which the devices that undergo a slice reselection process are selected and instructed. In situations in which a service that a slice can support will change, devices that require the service in question may be selected and instructed to request slice reselection.

Typically if the UE undergoes a handover to an access point that does not support the currently associated slice, a slice handover/reselection procedure is initiated. However, in some circumstances, for example for when a new slice is added to support a particular service, the new slice may include the same AP, if the AP is capable of belonging to two different slices.

Figure 5:
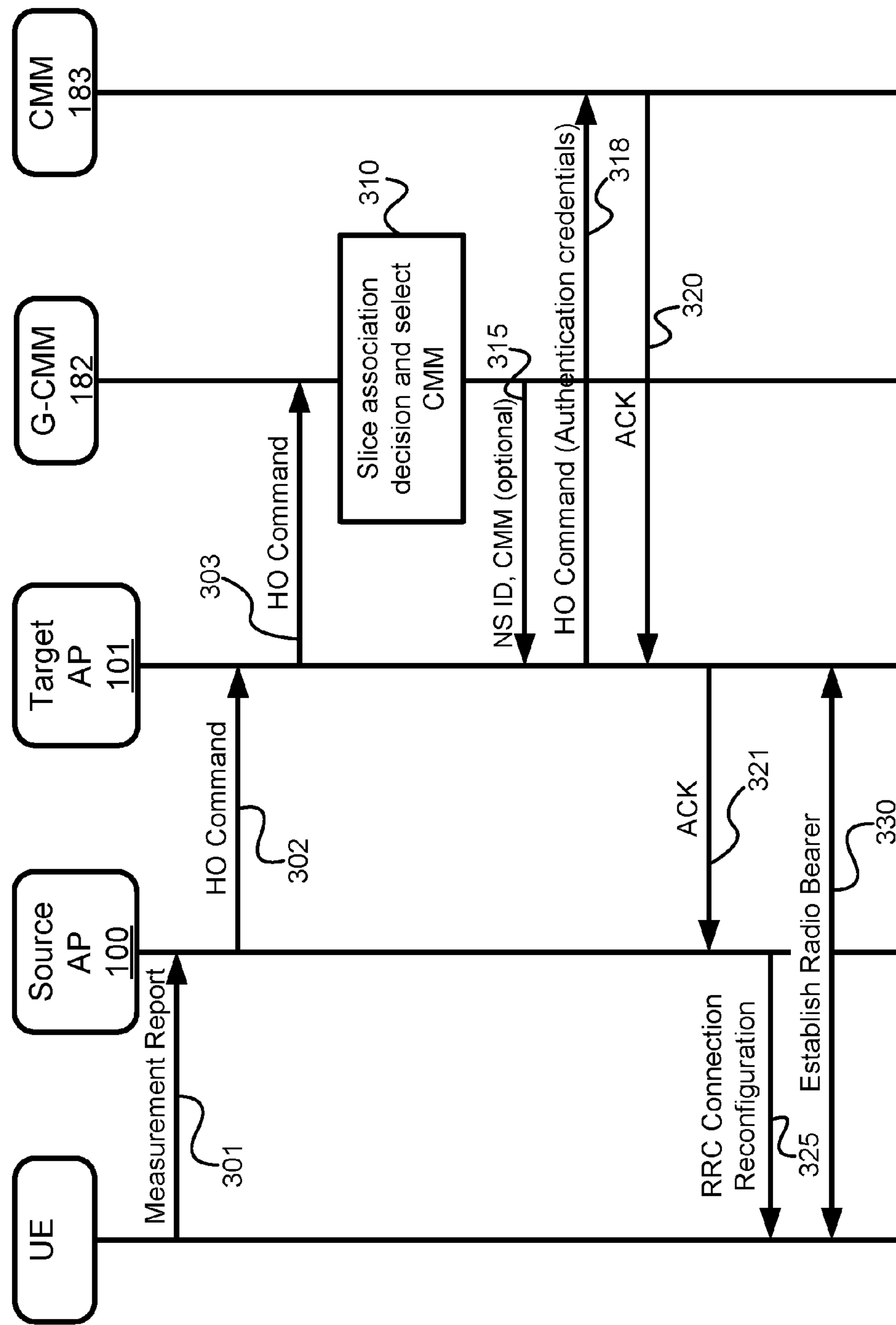
FIG. 5 illustrates a procedure for intra-operator slice handover in accordance with embodiments of the present invention.

An intra-operator handover, or an intra-operator reselection, is a term used to refer to a slice reselection procedure in which both the initial slice and the target slice are operated by the same service provider. FIG. 5 illustrates a procedure for such an intra-operator handover, according to an embodiment. In FIG. 5, a measurement report 301 is sent from the UE to the serving AP, also called the source AP 100. This measurement report indicates the need for a handover. For example, the measurement report 301 may indicate the UE is receiving a stronger signal from another AP (called the target AP 101) than from the source AP 100. Such a measurement report triggers the handover/reselection process if the target AP 101 supports a different set of slices than the source AP 100. It should be appreciated that other triggers are possible. For example, the source AP 100 may trigger the handover if its reception from the UE drops below a threshold. Alternatively, in some embodiments the CMM 183, which keeps track of the UE's location, may trigger the handover, for example in the case of location prediction. It will be understood that in embodiments in which a slice handover is triggered by a node other than the AP 100, it is possible for the handover procedure to start without involving the AP 100. As noted above, the CMM 183 is another node that could initiate a handover process, and in such as a case, the CMM 183 can transmit a message that would take the place of the measurement report.

Returning to FIG. 5, the source AP sends an HO command 302, which can also be called a reselection request or command, to the target AP 101, which belongs to a different slice. An AP 100 serving a UE, and connecting the UE to the first slice, can determine, based on information associated with the UE, including an estimated trajectory and information from the UE pertaining to which other APs can be seen. Based on the knowledge of network topology and slice support, AP 100 can determine both which AP the UE is likely to be next served by, and whether the UE should be moved to a different slice. The handover command is forwarded 303 from the target AP 101 to the G-CMM 181. In this example, the HO command 303 can be considered a trigger to initiate a slice reselection. Those skilled in the art will appreciate that the HO command 303 need not include an explicit selection of the slice that the UE will be moved to, and instead can, in some embodiments, contain enough information so that another entity such as the CMM can make the handover decision. The slice reselection event in this example is either the generation or receipt of the measurement report 301 that includes identification of a high likelihood of a need for a slice handover. The G-CMM 182, in this example includes a slice selection function (not shown), which performs the slice association and CMM selection process 310. When a new slice (NS) has been determined, the NS ID, and optionally the ID of CMM 183 is sent 315 to the target AP 101. If the ID of the CMM is not selected by the slice selection function then it can be selected by the target AP 101. In the meantime, a call admission process may be initiated by the target AP 101 to admit the device. This can include the target AP 101 sending an HO command including authentication credentials 318 to the CMM 183 of the new slice, and receiving an acknowledgement (ACK) 320 from the CMM 183. The target AP 101 then sends an ACK 321 to the source AP 100. Once the slice association and CMM selection process 310 is completed, the source AP 100 instructs the UE to reconfigure the Radio Resource Control (RRC) Connection 325. The RRC reconfiguration message 325 includes instructions that cause the UE to establish a radio connection 320 to the Target AP 101 (which is analogous to a radio bearer in LTE) to complete the handover. In an alternate embodiment, Source AP 100 and target AP 101 do not need to directly communicate with each other, and instead HO command 302 is transmitted from the source AP 100 to the G-CMM 182 or the CMM 183. The G-CMM 182 can select the appropriate slice and perform the slice selection as indicated in 310. Instead of target AP 101 transmitting ACK 321 to AP 100, the ACK can be sent to the G-CMM 182, which would then send an ACK to the source AP 100. In this embodiment, there is still an HO command 302 transmitted towards AP 101, but it is routed through network infrastructure instead of going AP-to-AP.

It should be noted that in situations in which an appropriate slice is not available, the G-CMM may use a default slice selection. In some embodiments, the default slice (also referred to as a common slice) will be a mobile broadband slice 120. Further, in other embodiments, the slice selection function may not be instantiated within the G-CMM 182, but instead can instantiated within the G-CSM 187, or some other function, for example a global slice manager (not shown), or be implemented by a host as a separate function.

Figure 6:
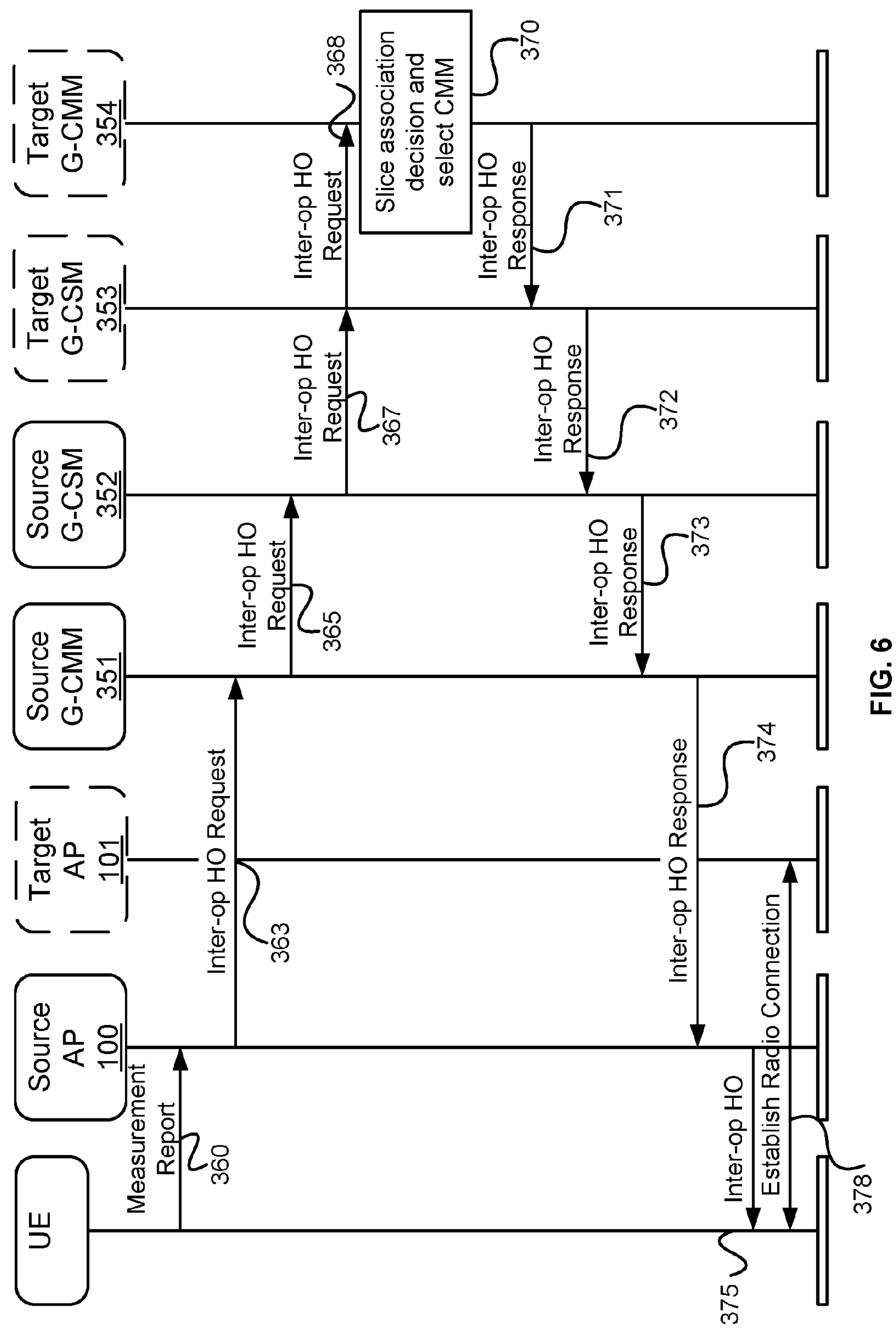
FIG. 6 illustrates a procedure for inter-operator handover according to a first option in accordance with embodiments of the present invention.

If intra-operator handover is either not possible or otherwise not preferred, then an inter-operator (Inter-op) handover can be performed. An Inter-op handover occurs when a mobile device associated with a slice in a first network operated by a first Operator (Operator A) is migrated to a slice in a second network operated by a second Operator (Operator B). For inter-operator handover, two example options are discussed. FIG. 6 illustrates an embodiment of a process according to a first option, in which the inter-operator handover request is sent from the source G-CSM to the target G-CSM. This request may use an Or-Or interface 234 (discussed above with reference to FIG. 4). Referring to FIG. 6, nodes in the first network are shown in solid line, and nodes in the second network are shown in dotted line. The UE sends a measurement report 360 to the source AP 100, in a similar manner as described above. Similar alternative triggers for the handover as discussed above also apply. An inter-op HO request 363 is sent to the source G-CMM 351, which forwards the request 365 to the source G-CSM 352. In one example, the source AP 100 sends an inter-op HO request 363 to the Source G-CMM 351 because it can determine that no Target AP that the UE can access is within the same network. In one embodiment, the inter-op HO request 363 specifies that it is a request to handover the UE service to a slice within another network, while in other embodiments, the inter-op HO request 363 is simply a handover request message that serves as a trigger for an inter-op handover. The source G-CSM 352 the forwards the inter-op HO request 367 to the target G-CSM 353 using the Or-Or interface 234. The target G-CSM 353 selects a target G-CMM 354 and forwards the request 368 to the target G-CMM 354. In this example target G-CMM 354 includes the slice selection function (not shown) which performs the slice association and local CMM selection process 370. A slice migration process occurs by sending target slice and CMM information to the UE via the source AP 100 using inter-op HO responses 371-375 as shown, and establishing a connection 378 between the UE and the target AP 101. Those skilled in the art will appreciate that AP 100 can generate the HO request 363 in accordance with the receipt of measurement report 360 from the UE. The measurement reports may include signal strength readings from APs that the UE can see. If AP 100 determines, for example in accordance with a projection of the UE trajectory, that the UE will be moving out of the AP's service area, and will not be served by other APs in the same network, the inter-op HO request 363 can include information identifying the APs that the UE may connect to. This allows the source G-CMM 351 to select the Target AP 101 that the UE should connect to.

Figure 7:
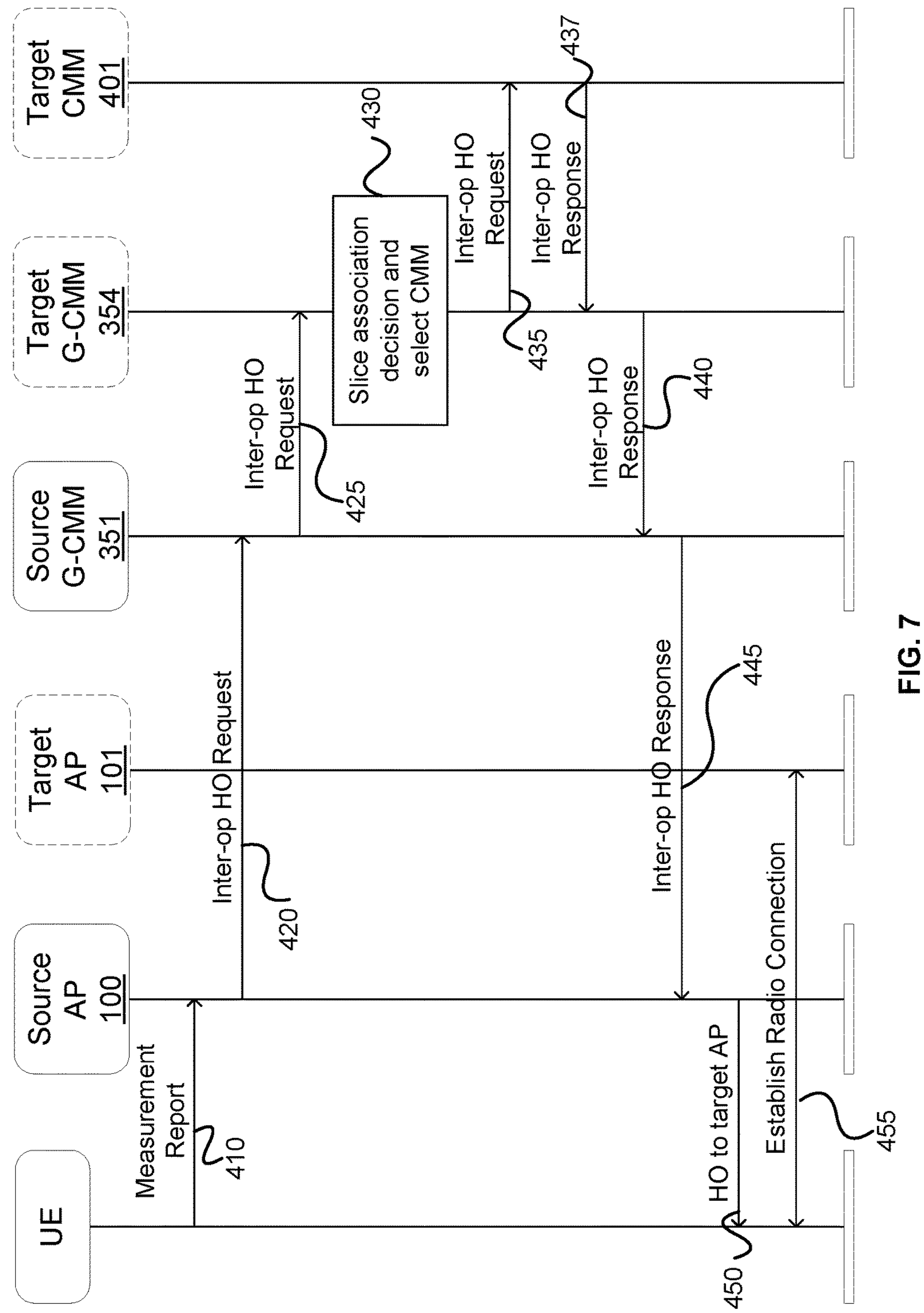
FIG. 7 illustrates a procedure for inter-operator handover according to a second option in accordance with embodiments of the present invention.

FIG. 7 illustrates an inter-operator slice reselection process according to a second option, in which the inter-operator handover request is sent through the source G-CMM to the target G-CMM. This option reduces the signaling overhead compared to the example process illustrated in FIG. 6, but it requires an interface between G-CMMs. Those skilled in the art will appreciate that unlike the method of FIG. 7, the method illustrated in FIG. 6 can re-use an existing Or-Or interface 234. As explained above with reference to FIG. 4, the network would typically already have an Or-Or interface 234 in place to allow networks to communicate with each other to enable the sharing resources for new service requests. The process illustrated in FIG. 6 can use this interface for passing messages used during a slice reselection process. The example process illustrated in FIG. 7 can reduce the amount of required signaling from process shown in FIG. 6, assuming a interface is established between a source G-CMM 351 in operator A's network and a target G-CMM 354 in operator B's network. In FIG. 7 target G-CMM 354 includes a slice selection function (not shown) which can perform the slice association and CMM selection process 430. If G-CMM 354 does not have a slice selection function, it can send a message to an externally instantiated slice selection function within its network (much as any functional entity described above or below could function without an internally instantiated slice selection function). Referring to FIG. 7, in which nodes in the first network are shown in solid line, and nodes in the second network are shown in dotted line, the UE sends a measurement report 410 to the source AP 100, in a similar manner as described above. Similar alternative triggers for the handover as discussed above also apply. An inter-op HO request 420 is sent to the source G-CMM 351, which forwards the request 425 to the target G-CMM 353 using the Or-Or interface 234. The target G-CMM 354 selects a target G-CMM 401. In this example target G-CMM 354 includes a slice selection function (not shown) which performs the slice association and CMM selection process 430. A slice migration process occurs by sending target slice and CMM information to the UE via the source AP using inter-op HO responses 440, 445 and 450 as shown, and establishing a connection 455 between the UE and the target AP 101.

Figure 8:
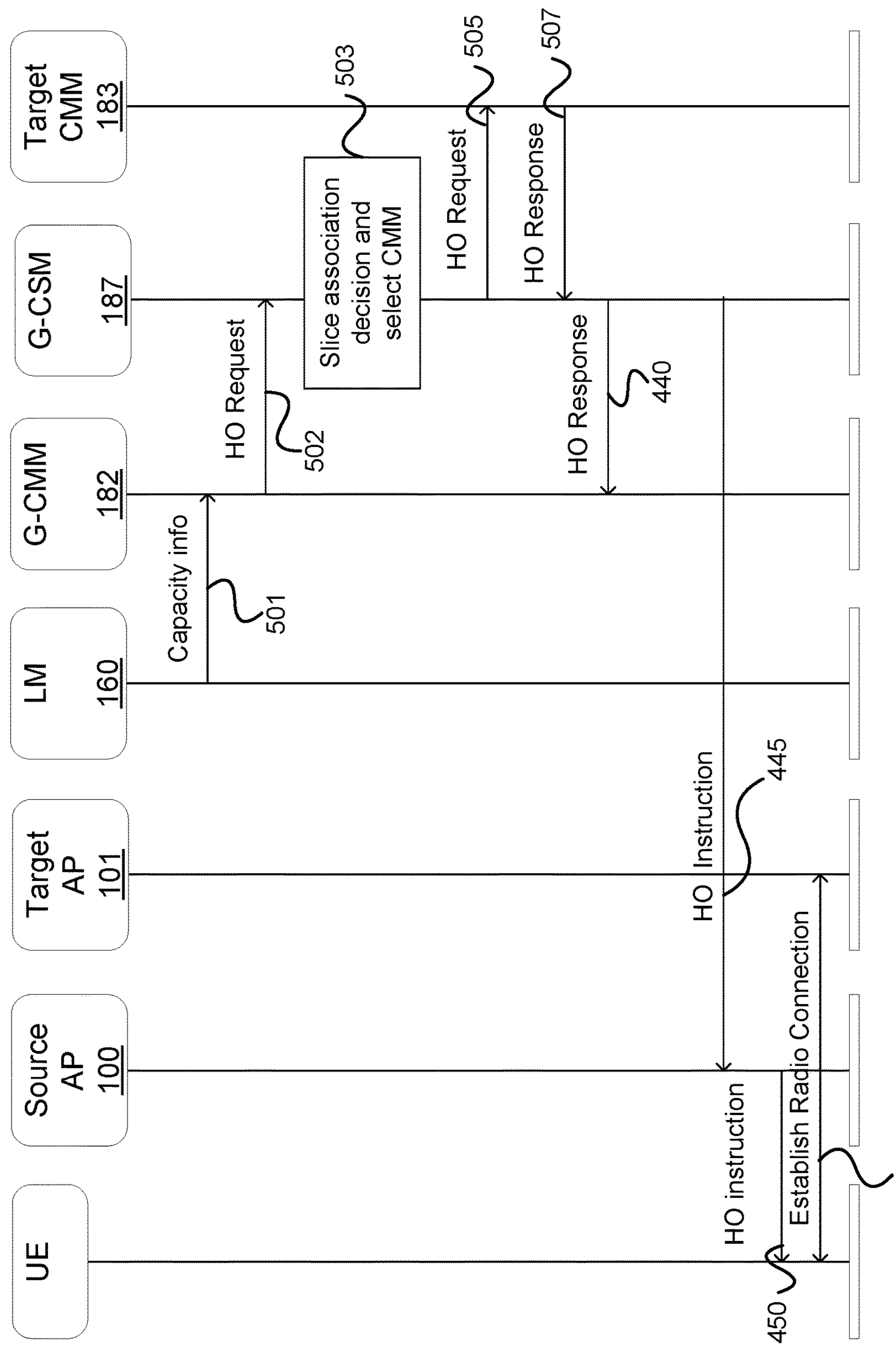
FIG. 8 illustrates a procedure for slice reselection for load balancing according to embodiments of the present invention.

FIG. 8 illustrates a procedure for slice reselection for load balancing according to embodiments of the present invention. As noted in earlier figures, the Slice Selection function can be instantiated in the CSM, as well as in the CMM. For the sake of completeness, FIG. 8 provides an illustration of a method in which the CSM hosts the slice selection function. It will be understood that this could be applied to the earlier disclosed methods, much as the use of the CMM instead of the CSM as the entity hosting the slice selection function, could be applied to the method of FIG. 8. FIG. 8 illustrates an example of a slice reselection event occurs when differing capacities between network slices reaches a load-balancing threshold. FIG. 8 illustrates an example where a monitoring function (e.g. for example LM 160) monitors the slice network resource utilization. In some embodiments, such a threshold may be triggered when the utilization of the source slice reaches a threshold. In other embodiments the threshold may depend on a comparison between slices, for example the difference in utilization between a source slice and a target slice. A load monitoring function, for example LM 160, sends the monitored capacity information 501 (i.e., the monitored slice utilization) to the G-CMM function 182. The G-CMM function can evaluate the received capacity information. The receipt of the capacity information can serve as a slice reselection event when reselection is performed in accordance with a need to load balance between slices. The G-CMM function 182 then transmits a HO request 502 (in some embodiments, this message can serve as a trigger for the slice reselection process) to a slice selection function, which in this example is part for G-CSM 187. In other embodiments the threshold can be detected and transmitted by another function which monitors slice resource utilization, for example DA function 165 of FIG. 1. The slice selection function (not shown) then performs a slice association and CMM selection process 503 to determine to which slice the UE(s) should be migrated. It is noted that for a slice reselection based on capacity or load-balancing, a group of UEs may be migrated at once. In the illustrated embodiment, G-CSM 187 sends an HO request 505 to the target CMM 183 of the new slice, and receives an acknowledgement (ACK) 507 from the CMM 183. If this is an intra-operator slice reselection, the G-CSM 187 will likely not need to confirm the availability of resources, but in an inter-operator slice reselection, this request and ACK exchange may be used to ensure that the target slice can support the UEs being migrated. The G-CSM 187 also sends an HO response 440 back to the G-CMM 182. The G-CSM 187 initiates the migration of the UE (or a group of UEs) to the new slice by sending an HO instruction 445 including the slice ID for the new slice to the Source AP 100, which forwards the information in HO instruction 450 to the UE. This allows for the establishment of radio connection 455 to be established with target AP 101 of the new slice to perfect the migration.

Figure 9:
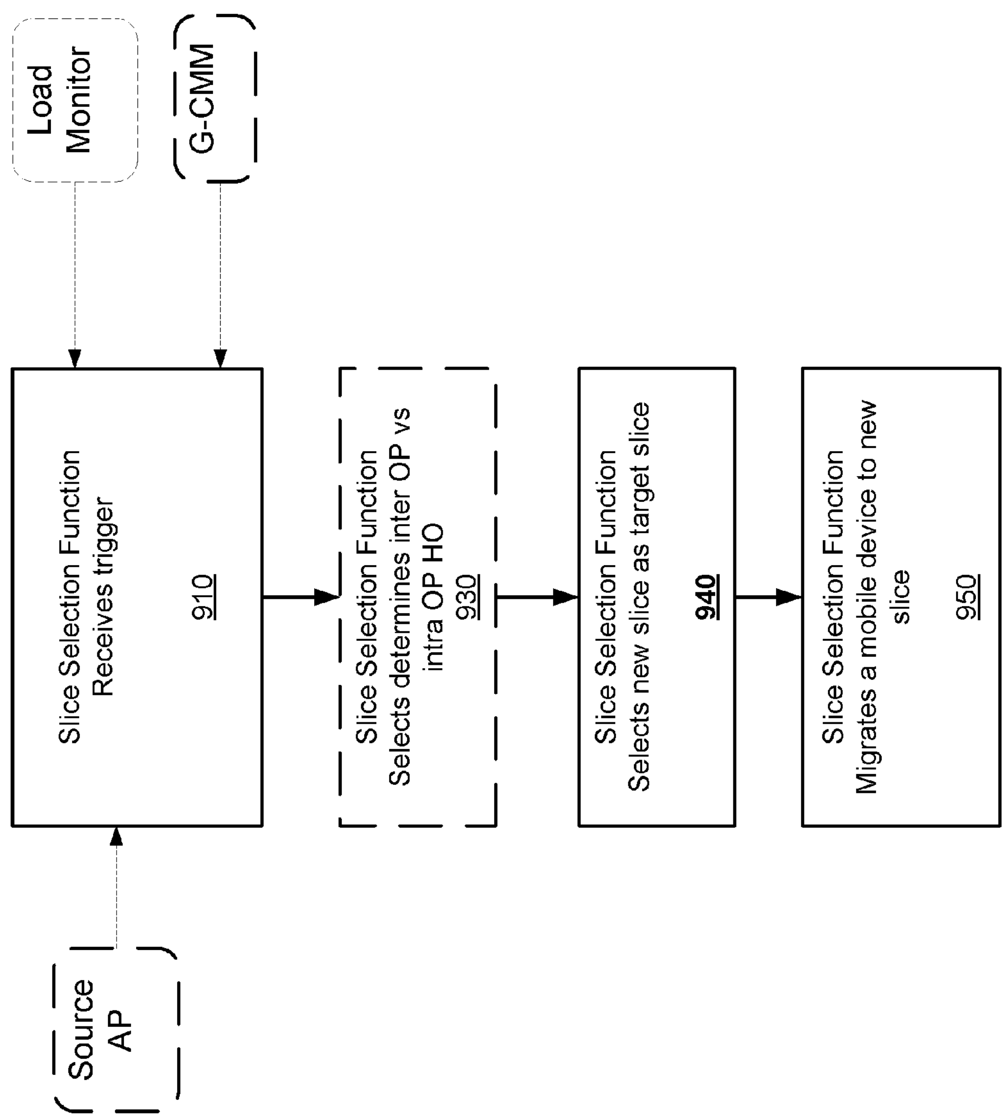
FIG. 9 is a flowchart illustrating a procedure for slice reselection according to embodiments of the present invention.

FIG. 9. is a flowchart illustrating a procedure for slice reselection according to embodiments of the present invention. FIG. 9 illustrates method steps that can be executed by a host processing system to implement a slice selection function. The steps shown in dashed line are optional. Steps indicated as optional may not be needed in some embodiments. Boxes with rounded corners indicate functions that may be distinct from the slice selection function and can provide input to the slice selection function.

At step 910 the slice selection function receives an indication that a slice reselection triggering events has occurred. This indication is typically received from another node or function in the network, including the load manager, the C-CMM, and the Source AP. In some cases the slice selection function receives data which it evaluates to determine that slice reselection triggering events has occurred. One such example is that the Source AP may send information based on access network conditions that it can observe, in addition to UE observed network conditions, so that the slice selection function can determine whether slice reselection is an appropriate action. In other cases, the slice selection function can receive a trigger message, when another node or function has determined that a slice reselection is required (typically as a result of an observed event). It should be understood that if a function such as a Load Monitor determines that a slice reselection is required, from the perspective of the Slice Selection Function, the transmission of a slice reselection instruction is an external event that can trigger the slice reselection process. As noted previously, there are several possible slice reselection triggering events. These events can be detected at different nodes and functions. When the node or function detecting the slice selection function is not the slice selection function itself, the slice selection function may receive the indication in the form of a message. In some embodiments the slice reselection triggering event is selected from the group consisting of:

the mobile device moves such that the mobile device has a clearer channel to an Access Point in another slice (e.g. roaming);

a slice management event, such as creating a slice, deleting a slice or modifying the parameters of a slice, occurs; and a load balancing threshold is met.

Accordingly, the trigger can be received by the slice selection function from the source AP, from the G-CMM, from the Load Monitor, or from some other function.

For example, if the UE is an MTC device, but it is the first MTC device admitted to the network, then a separate MTC slice 115 may not have been instantiated. Without an MTC slice, the MTC device may be assigned to a default slice, such as the MBB slice 120. As more MTC devices attach to the network, MTC slice 115 can be created. Creation of a slice, in this case MTC Slice 115, is a slice management event. In this example, when MTC slice 115 is created there may be benefits to moving any MTC device on the MBB slice 120 to the MTC slice 115. As such, the creation of MTC Slice 115 is a slice reselection triggering event. This slice reselection triggering event is associated with any MTC devices admitted to the MBB slice 120. In another example, after the instantiation of MTC Slice 115, if a sufficient number of MTC devices attached to the MTC slice 115 are deactivated, there may no longer be sufficient traffic to justify allocating network resources to the MTC slice 115. Accordingly the MTC slice may be scheduled for termination. The determination that the MTC Slice 115 is going to be deleted is a slice management event. In this example, determining that the slice is to be deleted is the slice reselection triggering event. When it is determined that the MTC slice 115 is to be deleted, any MTC devices attached to the MTC slice 115 are moved to the default MBB slice 120. As another example, the resources allocated to a particular slice may change, with some slices being allocated more or less resources. Such a slice management event can also trigger a slice reselection.

In some embodiments, the slice selection function, upon receiving an indication of a slice reselection trigger event in 910, can determine 930 if the slice reselection is to be an inter-operator or intra-operator slice handover. As noted above, this determination can be made in accordance with data from the source AP, the UE measurements, and other information including agreements with other network operators. In accordance with the data from the AP and the UE, the slice selection function can determine which APs are likely to provide the best service to the UE. If the serving AP is at or near the edge of the network coverage, an interoperator handover will be likely. In which case the slice handover can be accomplished using an intra-operator HO, for example as discussed with reference to FIG. 5. If so, the intra-operator procedure is implemented. Alternatively, the new network slice belongs to a different operator network than the slice previously supporting the mobile device. In which case an inter-operator procedure is implemented, for example as discussed with reference to the embodiments illustrated in FIGS. 6 and 7. In some embodiments the source AP, knowing that it is not at the edge of the coverage area of the network can default to trying an intra-OP request unless instructed otherwise. As noted above, the source AP can send a handover request towards a potential target AP in the same network (i.e., a first network), either directly or through a function such as the CMM. If the source AP is at the edge of coverage, it can determine based on the UE measurement reports that the UE is leaving the network coverage area. This will likely result in an Inter-operator handover. The Source AP can send the handover request towards the slice selection function. In the embodiments illustrated in FIGS. 5-7, the slice selection function (SSF) is instantiated as a part of within the G-CMM function. As previously stated, the SSF may instead be instantiated as a part of the G-CSM function, as illustrated in FIG. 1 and FIG. 8. In other embodiments, it can be instantiated as part of another function or instantiated as a separate function.

At step 940, the slice selection function selects a new slice as a target slice. This can be implemented by making a slice association decision and then selecting a CMM function for the target slice. It will be well understood that when a device such as a UE attaches to a network it is assigned a slice, typically based on its service requirements. Any number of different processes can be used to carry out this so-called slice association process. These processes that are suitable for initial slice association can be used (sometimes with minor modifications that would be apparent to those skilled in the art) as slice-reselection processes. It will be understood that in some embodiments a restriction would be placed on a slice selection function to not select the slice that the UE is already associated with.

Finally at step 950 the slice selection function initiates the migration of the mobile device to the target slice. In some embodiments this includes sending messages to network components (which can include network functions and APs) in order to migrate the mobile device to the target slice.

In some embodiments, a group of devices, or in some cases all of the devices associated with a slice, may be migrated to a different operator, which can be triggered for reasons other than mobility. For example, a particular enterprise may have VNs established with two wireless network operators (WNOs). In some embodiments, the enterprise, via the source G-CMM, can request the VN be moved from a slice operated by a first WNO to a second slice operated by the second WNO. Although this may be viewed as a handover of a slice, it is possible that this would be implemented by creating a slice on the new operator, and performing a migration of the user data along with a forced handover of the UEs.

It will be readily understood that, throughout the preceding discussion, the above-described network functionalities and operations may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 10:
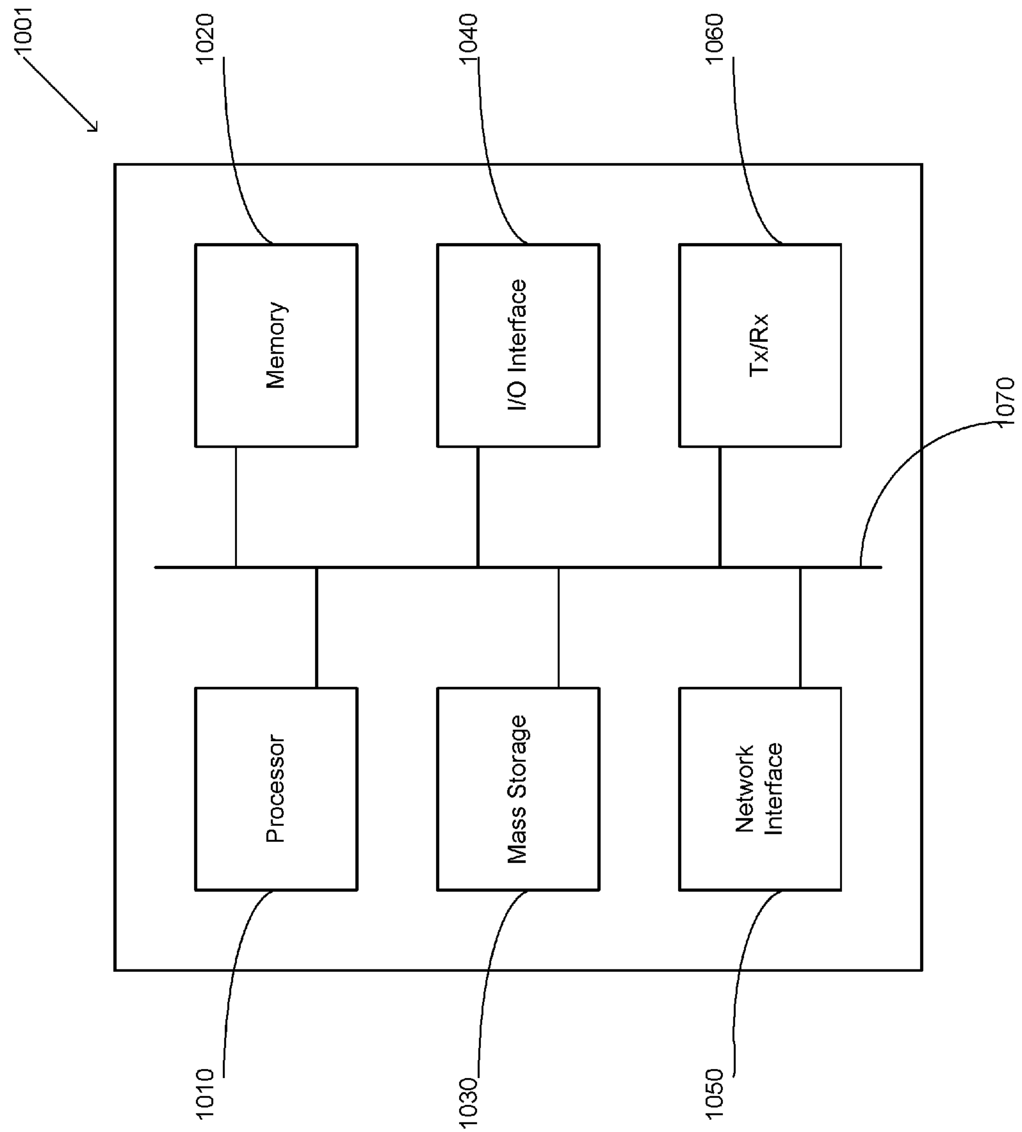
FIG. 10 is a block diagram of a processing system which can host the various functions described herein, according to an embodiment.

FIG. 10 is a block diagram of a processing system 1001 that may be used for implementing the various network elements which instantiate the functions defined herein, for example a host implementing a Slice Selection function, a Slice manager function, or a CMM function, a CSM function, or the like. As shown in FIG. 10, processing system 1010 includes a processor 1010, working memory 1020, non-transitory storage 1030, network interface 1050, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1001 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements an instructions executable by the processor for performing the aforementioned functions and steps of plural components defined above.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for network slice reselection comprising:

determining, by a connection and mobility management (CMM) function, whether a slice reselection triggering event associated with a mobile device attached to a first slice has occurred;

sending, by the CMM function, to a slice selection function (SSF), a message to select a second slice to serve the mobile device;

selecting, by the SSF, a second slice to serve the mobile device attached to the first slice and sending information about the second slice to the CMM function;

obtaining, by the CMM function, the information about the second slice from the SSF; and instructing, by the CMM function, the mobile device to connect to the second slice, wherein the slice reselection triggering event comprises one of the following: a slice management event, a movement of the mobile device, and a change in the service requirements of the mobile device.

2. The method of claim 1 wherein the slice management event is indicative that the first slice is unavailable.

3. The method of claim 1, wherein instructing the mobile device to connect to the second slice comprises sending, by the CMM function, information about the second slice to the mobile device.

4. The method of claim 1, wherein instructing the mobile device to connect to the second slice comprises sending, by the CMM function, information associated with a target CMM function to an access point associated with the first slice.

5. The method of claim 1, wherein instructing the mobile device to connect to the second slice comprises sending, by the CMM function, instructions for the mobile device to reconfigure a Radio Resource Control (RRC) connection.

6. The method of claim 1 wherein the CMM function maintains a list of instantiated network slices and the parameters associated with each network slice.

7. The method of claim 1 wherein the first slice and the second slice are operated by the same service provider.

8. The method of claim 1 wherein the first slice and the second slice are operated by different service providers.

9. The method of claim 1 wherein the slice reselection triggering event is indicative of the mobile device receiving a stronger signal from a second access point.

10. The method of claim 1 wherein a slice management event comprises one of:

creation of a new slice;

termination of an existing slice; and modification of the capacity of an existing slice.

11. The method of claim 1, the second slice being supported by another CMM function.

12. The method of claim 1 wherein the CMM function is shared by the first and second slices.

13. The method of claim 1, wherein the information includes the services provided by the second slice.

14. The method of claim 1, wherein the information further includes a target CMM function that supports the second slice.

15. The method of claim 14, wherein the second slice is supported by the target CMM function and provides at least one service requested by the mobile device.

16. A communication system comprising at least one processor and a non-transitory memory storing instructions for execution by the at least one processor to implement a connection and mobility management (CM) function and a slice selection function (SSE) responsible for network slice reselection, the CMM function and the SSF being communicatively coupled through an interface, wherein:

the instructions when executed by the at least one processor implement the CM function to:

determine whether a slice reselection triggering event associated with a mobile device attached to a first slice has occurred; and send a message to the SSE to select a second slice to serve the mobile device;

the instructions when executed by the at least one processor implement the SSF to:

receive the message and select a second slice, to serve the mobile device attached to the first slice; and send information about the second slice to the CMM function; and wherein the CMM function is further configured to obtain the information about the second slice from the SSF; and instruct the mobile device to connect to the second slice, wherein the slice reselection triggering event comprises one of the following: a slice management event, a movement of the mobile device, and a change in the service requirements of the mobile device.

17. The communication system of claim 16 wherein the slice management event is indicative that the first slice is unavailable.

18. The communication system of claim 16 wherein instructing the mobile device to connect to the second slice comprises sending information about the second slice to the mobile device.

19. The communication system of claim 16 wherein instructing the mobile device to connect to the second slice comprises sending information associated with a target CMM function to an access point associated with the first slice.

20. The communication system of claim 16 wherein instructing the mobile device to connect to the second slice comprises sending instructions for the mobile device to reconfigure a Radio Resource Control (RRC) connection.

21. The communication system of claim 16 wherein the CMM function maintains a list of instantiated network slices and the parameters associated with each network slice.

22. The communication system of claim 16, the second slice being supported by another CMM function.

23. The communication system of claim 16 wherein the CMM function is shared by the first and second slices.

* * * * *